US012446835B2

(12) United States Patent
Madsen et al.

(10) Patent No.: US 12,446,835 B2
(45) Date of Patent: Oct. 21, 2025

(54) HEARING SYSTEM WITH CARDIAC ARREST DETECTION

(71) Applicant: GN Hearing A/S, Ballerup (DK)

(72) Inventors: Marie Maj Madsen, Copenhagen K (DK); Christoffer Dyssegard, Smørum (DK)

(73) Assignee: GN HEARING A/S, Ballerup (DK)

( * ) Notice: Subject to any disclaimer, the term of this patent is extended or adjusted under 35 U.S.C. 154(b) by 375 days.

(21) Appl. No.: 18/107,423

(22) Filed: Feb. 8, 2023

(65) Prior Publication Data

US 2023/0248321 A1 Aug. 10, 2023

(30) Foreign Application Priority Data

Feb. 10, 2022 (DK) .......................... PA 2022 70054

(51) Int. Cl.
*A61B 5/0205* (2006.01)
*A61B 5/00* (2006.01)
(Continued)

(52) U.S. Cl.
CPC .............. *A61B 5/7275* (2013.01); *A61B 5/11* (2013.01); *A61B 5/4803* (2013.01);
(Continued)

(58) Field of Classification Search
CPC ..... A61B 5/0002; A61B 5/0205; A61B 5/024; A61B 5/053; A61B 5/087; A61B 5/11;
(Continued)

(56) References Cited

U.S. PATENT DOCUMENTS 7,158,931 B2 * 1/2007 Allegro ................ H04R 25/505 704/200
7,609,904 B2 * 10/2009 Miller ..................... G10L 19/02 704/200
(Continued)

FOREIGN PATENT DOCUMENTS

EP 3 618 456 A1 3/2020
WO WO 2020261044 12/2020
(Continued)

OTHER PUBLICATIONS

European Search Report for EP Patent Appln. No. 23155982.4 dated Jun. 10, 2023.
(Continued)

*Primary Examiner* — Gerald Gauthier
(74) *Attorney, Agent, or Firm* — Vista IP Law Group, LLP

(57) ABSTRACT

A hearing system is disclosed. The hearing system comprises a hearing aid and an accessory device. The hearing aid comprises a microphone for provision of a microphone input signal. one or more processors of the hearing system are configured to obtain audio data based on the microphone input signal. The one or more processors of the hearing system are configured to determine a cardiac condition parameter indicative of a risk of cardiac arrest based on the audio data. The one or more processors of the hearing system are configured to determine whether one or more cardiac criteria are satisfied. The one or more processors of the hearing system are configured to output, in accordance with a first cardiac criterion being satisfied, a first warning signal, the first warning signal being indicative of the cardiac condition parameter.

27 Claims, 3 Drawing Sheets

(51) Int. Cl.

| | |
|---|---|
| ***A61B 5/11*** | (2006.01) |
| ***A61B 7/00*** | (2006.01) |
| ***G10L 15/22*** | (2006.01) |
| ***G10L 15/26*** | (2006.01) |
| ***G10L 25/66*** | (2013.01) |
| ***H04R 25/00*** | (2006.01) |
| *G06F 40/279* | (2020.01) |

(52) U.S. Cl.
CPC ............ *A61B 5/6817* (2013.01); *A61B 5/746* (2013.01); *A61B 7/003* (2013.01); *G10L 15/22* (2013.01); *G10L 15/26* (2013.01); *G10L 25/66* (2013.01); *H04R 25/554* (2013.01); *H04R 25/604* (2013.01); *A61B 2562/0204* (2013.01); *A61B 2562/0219* (2013.01); *G06F 40/279* (2020.01); *H04R 2225/55* (2013.01)

(58) Field of Classification Search
CPC ... A61B 5/1123; A61B 5/14552; A61B 5/316; A61B 5/346; A61B 5/361; A61B 5/4803; A61B 5/6804; A61B 5/6817; A61B 5/7264; A61B 5/7275; A61B 5/742; A61B 5/746; A61B 7/003; A61B 2562/0204; A61B 2562/0219; A61B 5/02007; A61B 5/38; A61B 7/00; A61B 7/04; A61B 7/045; G06F 18/2134; G06F 40/279; G10L 13/0335; G10L 15/08; G10L 15/22; G10L 15/26; G10L 25/66; G10L 17/26; G10L 19/02; G16H 30/40; G16H 40/63; G16H 40/67; G16H 50/30; H04R 25/40; H04R 25/554; H04R 25/604; H04R 25/656; H04R 2225/55; H04R 1/40; H04R 25/305; H04R 25/505; H04R 25/652; H04W 4/80; A61K 9/0019; A61N 1/39044; C12N 9/93
See application file for complete search history.

(56) References Cited

U.S. PATENT DOCUMENTS 8,494,193 B2 * 7/2013 Zhang .................... H04R 25/40
704/200
8,655,440 B2 * 2/2014 Adachi .................... A61B 5/38
704/200
9,125,566 B2 * 9/2015 Libbus ................... G16H 40/67
10,321,836 B2 * 6/2019 Walker ................... A61B 5/316
11,446,398 B2 * 9/2022 Barrett ..................... C12N 9/93
11,771,372 B2 * 10/2023 Voix ..................... A61B 5/6817
704/200
12,336,790 B2 * 6/2025 Elghazzawi ......... A61B 5/0205
2007/0293738 A1 * 12/2007 Bardy .................. A61B 5/0002
600/300
2009/0268962 A1 * 10/2009 Fearon ................ G06F 18/2134
704/200
2011/0021935 A1 * 1/2011 Ghodrati ................ A61B 5/024
600/519
2013/0343585 A1 * 12/2013 Bennett ................... H04W 4/80
381/317
2014/0107503 A1 * 4/2014 Sachanandani ........ A61B 5/087
600/528
2015/0099941 A1 * 4/2015 Tran ....................... A61B 7/045
600/300
2015/0230036 A1 * 8/2015 Pedersen .............. H04R 25/305
381/330
2017/0243582 A1 * 8/2017 Menezes ............. G10L 13/0335
2017/0289704 A1 * 10/2017 Frederiksen ........... G16H 40/63
2018/0146922 A1 * 5/2018 Wang .................. A61B 5/6804
2019/0174238 A1 * 6/2019 Lunner ................ H04R 25/554
2019/0216350 A1 7/2019 Sullivan et al.
2019/0253793 A1 * 8/2019 Pedersen .................. H04R 1/40
2019/0313920 A1 * 10/2019 Banerjee ............ A61B 5/02007
2019/0362740 A1 * 11/2019 Hauptman .............. G10L 17/26
2019/0374428 A1 * 12/2019 Kaufman ........... A61N 1/39044
2020/0138299 A1 * 5/2020 Goldman ............. A61B 5/0205
2020/0138315 A1 * 5/2020 Goldman ............... A61B 5/361
2020/0219506 A1 * 7/2020 Bhowmik ............... G10L 15/08
2020/0245869 A1 8/2020 Sivan et al.
2020/0374641 A1 * 11/2020 Husung ................ H04R 25/656
2021/0052229 A1 * 2/2021 Stephens .............. A61B 5/7264
2021/0275038 A1 * 9/2021 Guo ................... A61B 5/14551
2021/0306771 A1 * 9/2021 El Guindi .............. A61B 5/053
2022/0189278 A1 * 6/2022 Hannemann ......... H04R 25/554
2022/0210586 A1 * 6/2022 Reinhart ................ A61B 5/346
2022/0240796 A1 * 8/2022 Barnacka ................. A61B 7/00
2022/0313669 A1 * 10/2022 Chen .................... A61K 9/0019
2023/0130889 A1 * 4/2023 Glenn ................ A61B 5/14552
600/324
2023/0185524 A1 * 6/2023 Koker .................... G16H 30/40
704/200
2023/0233149 A1 * 7/2023 Parker .................... A61B 5/742
600/301
2023/0248321 A1 * 8/2023 Madsen ............... A61B 5/1123
600/301

FOREIGN PATENT DOCUMENTS

WO WO 2021181351 9/2021
WO WO 2021224497 11/2021

OTHER PUBLICATIONS

Foreign Technical Examination for Danish Patent Appln. No. PA 2022 70054 dated Apr. 6, 2022.

* cited by examiner

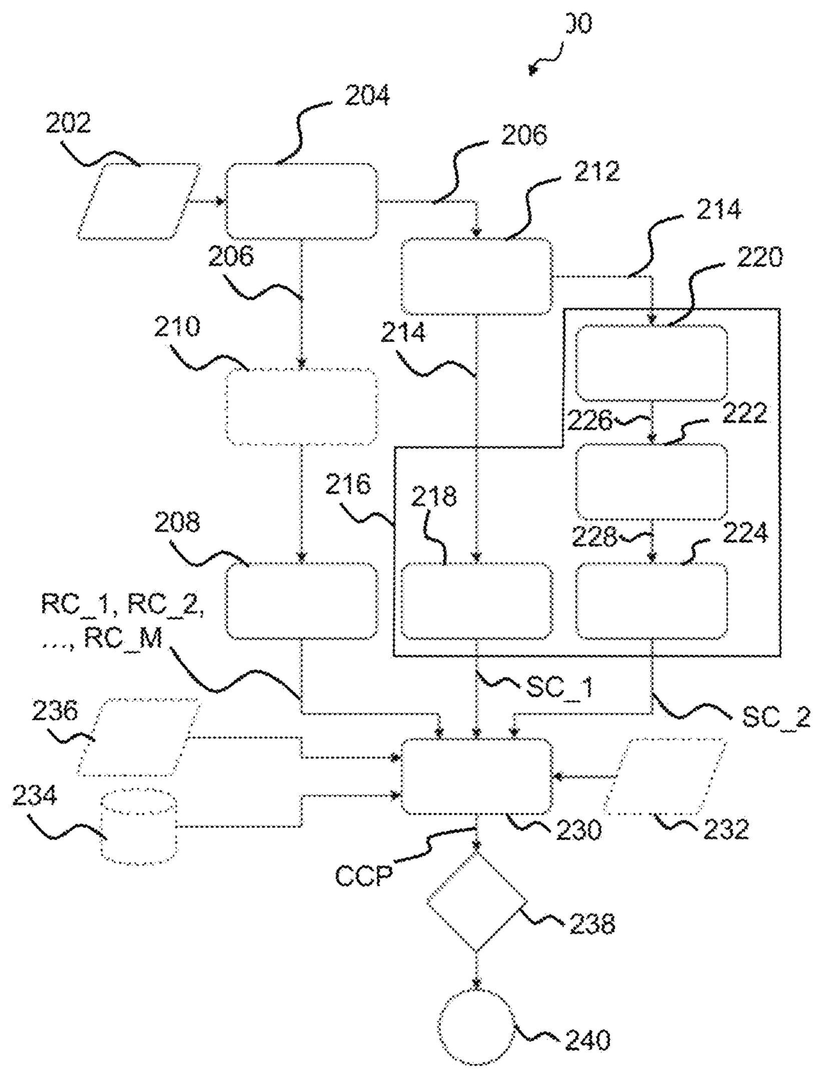

Fig. 3

| | |
|---|---|
| 200 | one or more processors of a hearing system |
| 202 | audio data |
| 204 | feature extractor |
| 206 | features of the audio data |
| 208 | first classifier, respiratory classifier |
| 210 | compression module |
| 212 | text extractor |
| 214 | text output |
| 216 | speech analyser |
| 218 | text analyser |
| 220 | word embedding module |
| 222 | sentence collector |
| 224 | second classifier |
| 226 | text string output |
| 228 | sentence output |
| 230 | cardiac arrest module |
| 232 | motion data source |
| 234 | user data source |
| 236 | body data source |
| 238 | block, criteria satisfied? |
| 240 | output block |

HEARING SYSTEM WITH CARDIAC ARREST DETECTION

RELATED APPLICATION DATA

This application claims priority to, and the benefit of, Danish Patent Application No. PA 2022 70054 filed on Feb. 10, 2022. The entire disclosure of the above application is expressly incorporated by reference herein.

FIELD

The present disclosure relates to a hearing system for cardiac arrest detection and related methods.

BACKGROUND

People suffering from cardiac arrest outside the hospital have a high risk of mortality. In this scenario, early prediction of cardiac arrest can provide the time required for intervening and preventing critical situations to reduce mortality.

SUMMARY

Accordingly, there is a need for systems and methods with improved cardiac arrest detection.

Accordingly, a hearing system is disclosed, the hearing system comprising a hearing aid and an accessory device. The hearing aid comprises a microphone for provision of a microphone input signal. The hearing system may comprise one or more processors. The one or more processors of the hearing system are configured to obtain audio data based on the microphone input signal. The one or more processors of the hearing system are configured to determine a cardiac condition parameter, e.g. indicative of a risk of cardiac arrest, based on the audio data. The one or more processors of the hearing system are configured to determine whether one or more cardiac criteria are satisfied. The one or more processors of the hearing system are configured to output, in accordance with a first cardiac criterion being satisfied, a first warning signal, the first warning signal optionally being indicative of the cardiac condition parameter.

Further, a method of operating a hearing system comprising a hearing aid, the hearing aid comprising a microphone is provided. The method comprising obtaining a microphone input signal with the microphone; obtaining audio data based on the microphone input signal; determining a cardiac condition parameter indicative of a risk of cardiac arrest based on the audio data; determining whether one or more cardiac criteria are satisfied; and in accordance with a first cardiac criterion being satisfied, outputting, in accordance with a first cardiac criterion being satisfied, a first warning signal, the first warning signal optionally being indicative of the cardiac condition parameter.

The present disclosure allows for improved cardiac arrest detection or early cardiac arrest detection by determining the risk of cardiac arrest based on the microphone phone input signal indicative of a hearing aid user's speech, breathing, statement, and/or vocal expression, such as words and sentences. In other words, the present disclosure allows for improved early detection of risk cardiac arrest of a hearing aid user based on the user's speech characteristics, user's breathing characteristics, and/or the user's vocal expressions.

Hearing aids are known to be worn for long periods of time during a day, and therefore a hearing aid with cardiac arrest detection capabilities increases the probability of cardiac arrest detection.

Further, it is an advantage of the present disclosure that the risk of cardiac arrest is determined dynamically based on the microphone input signal. This, in turn, facilitates the user to prepare for a remedy action in advance, such as calling for emergency health support.

Further, the present disclosure allows for improved early cardiac arrest detection based on the microphone phone input signal associated with the user's hearing aid in combination with the additional information associated with the user, such as user body data, user habits, user activity, and/or user routine.

BRIEF DESCRIPTION OF THE DRAWINGS

The above and other features and advantages will become readily apparent to those skilled in the art by the following detailed description of example embodiments thereof with reference to the attached drawings, in which.

DETAILED DESCRIPTION

Figure 1:
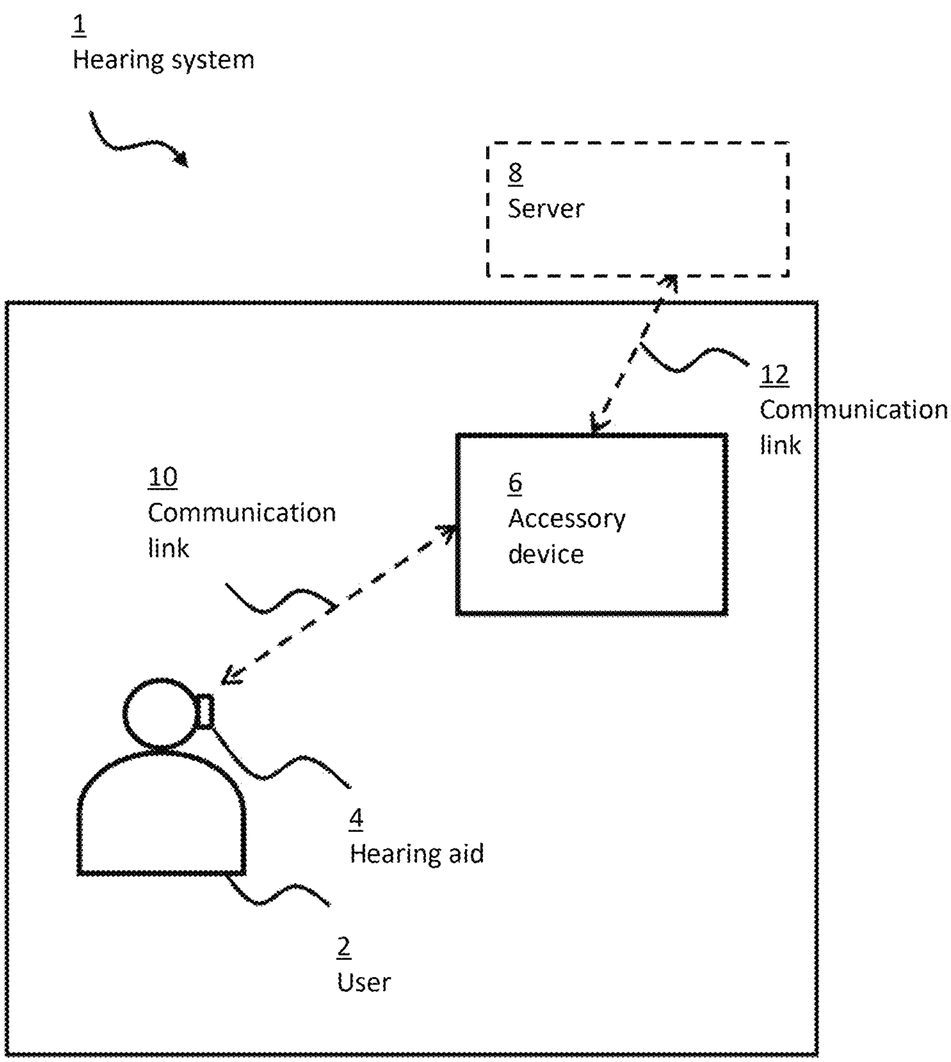
FIG. 1 schematically illustrates an example hearing system according to the disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing system is disclosed. The hearing system comprises a hearing aid and an accessory device. The hearing aid comprises a microphone for provision of a microphone input signal. The hearing system comprises one or more processors, such as a first processor, a second processor, and/or a third processor. In one or more example hearing systems, the hearing aid may comprise the one or more processors. In one or more example hearing systems, the accessory device may comprise the one or more processors. The one or more processors and/or processing of the hearing system may be distributed in the hearing aid and the accessory device.

The accessory device as disclosed herein may comprise one or more processors, a memory, an interface and one or more transducers, such as a microphone, such as a first accessory device microphone and/or a speaker, such as an accessory device speaker. In one or more example hearing systems, the accessory device may be seen as an electronic device such as a mobile phone, a tablet, a computer, a display, a smart speaker, a smart watch, and/or a TV.

In one or more example hearing systems, the accessory device may be seen as a user accessory device, such as a mobile phone, a smart watch, a tablet, and/or a wearable gadget. In one or more example hearing systems, the accessory device may comprise one or more transceivers for wireless communication. In one or more example hearing systems, the accessory device may facilitate wired communication, such as by using a cable, such as an electrical cable.

The hearing aid as disclosed herein may comprise one or more processors, a memory, an interface and one or more transducers, such as microphone(s), such as a first microphone and/or a receiver, such as a hearing aid speaker.

The hearing aid may be configured to be worn at an ear of a user. The hearing aid may be a hearable. The hearing aid may be a hearing aid, wherein the processor(s) is configured to compensate for a hearing loss of a user.

The hearing aid may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

In one or more example hearing systems, the hearing aid may be seen as a user hearing aid, such as a headphone, an earphone, a hearing aid, an over-the-counter (OTC) hearing aid, and/or a hearing protection device. In one or more example hearing systems, the hearing aid may comprise one or more transceivers for wireless communication. In one or more example hearing systems, the hearing aid may facilitate wired communication, such as by using cable, such as an electrical cable.

The hearing aid may be configured for wireless communication, e.g. via the interface, with one or more devices, such as with another hearing aid, e.g. as part of a binaural hearing system, and/or with one or more accessory devices, such as a smartphone and/or a smart watch. The hearing aid optionally comprises an antenna for converting one or more wireless input signals. The wireless input signal(s) may origin from external source(s), such as spouse microphone device(s), wireless TV audio transmitter, and/or a distributed microphone array associated with a wireless transmitter. The wireless input signal(s) may origin from another hearing aid, e.g. as part of a binaural hearing system, and/or from one or more accessory devices.

The hearing aid optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing aid may comprise a plurality of antennas and/or an antenna may be configured to be operate in one or a plurality of antenna modes.

The hearing aid comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more example hearing aids, the number N of microphones is two, three, four, five or more. The set of microphones may comprise a third microphone for provision of a third microphone input signal. In one or more example hearing aids, the microphone input signal may be from a single microphone signal, such as first microphone signal, or a combination of microphone input signals from a plurality of microphones. For example, the microphone signal may be based on a first microphone input signal from a first microphone and/or a second microphone input signal from a second microphone.

The hearing aid comprises a processor or a plurality of processors for processing input signals, such as transceiver input signal(s) and/or microphone input signal(s). The processor(s) is optionally configured to compensate for hearing loss of a user of the hearing aid. The processor(s) provides an electrical output signal based on the input signals to the processor. Input terminal(s) of the processor are optionally connected to respective microphones and/or output terminals of a pre-processing unit. One or more microphone input terminals of the processor may be connected to respective one or more microphone output terminals of the pre-processing unit.

The hearing system, the hearing aid, and/or the accessory device may be configured for wireless communications via a wireless communication system, such as short-range wireless communications systems, such as Wi-Fi, Bluetooth, Zigbee, IEEE 802.11, IEEE 802.15, infrared and/or the like.

The hearing system, the hearing aid and/or the accessory device may be configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, millimeter-wave communications, such as millimeter-wave communications in licensed bands, such as device-to-device millimeter-wave communications in licensed bands.

In one or more example hearing systems, the hearing aid may comprise one or more sensors, such as one or more of a body sensor, e.g., a heart rate sensor, a blood pressure sensor, a pulse sensor, a photoplethysmogram (PPG) sensor, an electrocardiogram (ECG) sensor, an electroencephalogram (EEG) sensor, a bioimpedance sensor, and a temperature sensor. The one or more sensors of the hearing aid may comprise a body sensor being a conductivity sensor, e.g. to measure and/or determine stress levels.

In one or more example hearing systems, the one or more sensors of the hearing aid comprises one or more motion sensors, e.g., an accelerometer, an inertial motion sensor, a gyroscope, an altimeter, and/or a position sensor such as a GPS sensor.

In one or more example hearing systems, the accessory device may comprise one or more sensors, such a body sensor, e.g., a heart rate sensor, a blood pressure sensor, a pulse ox sensor, a photoplethysmogram (PPG) sensor, an electrocardiogram (ECG) sensor, an electroencephalogram (EEG) sensor, a bioimpedance sensor, and/or a temperature sensor. The one or more sensors of the accessory device may comprise a body sensor being a conductivity sensor, e.g. to measure and/or determine stress levels.

In one or more example hearing systems, the one or more sensors of the accessory device comprises one or more motion sensors, e.g., an accelerometer, an inertial motion sensor, a gyroscope, an altimeter, and/or a position sensor such as a GPS sensor.

In one or more example hearing systems, the body sensors are configured to determine body data indicative of user's body information for provision of the cardiac condition parameter. In one or more example hearing systems, the motion sensors are configured to determine motion data indicative of user's motion information for provision of the cardiac condition parameter.

In one or more example hearing systems, a user may be seen a user of the hearing aid and/or a user of the accessory device.

The one or more processors of the hearing system are configured to obtain audio data based on the microphone input signal. In one or more example hearing systems, one or more of the one or more processors may be a part of the hearing aid and/or one or more of the one or more processors may be a part of the accessory device.

In one or more example hearing systems, the one or more processors may be configured to obtain, via the interface of the hearing aid, the (first) microphone input signal from the first microphone of the hearing aid. In one or more examples, the audio data is based on the (first) microphone input signal obtained from the first microphone.

In one or more example hearing systems, the one or more processors may be configured to obtain, via the interface of the accessory device, the microphone input signal from a first accessory device microphone of the accessory device. In one or more examples, the audio data is based on the microphone input signal obtained from the first accessory device microphone.

In one or more example hearing systems, the one or more processors may be configured to obtain, via the interface of the accessory device, the microphone input signal from the first microphone of the hearing aid. In one or more examples, the audio data is based on the microphone input signal obtained from the first microphone of the hearing aid.

In one or more example hearing systems, to obtain audio data comprises to obtain the microphone input signal from the first microphone of the hearing aid for provision of the audio data and transmit the audio data from the hearing aid to the accessory device. In other words, the hearing aid may be configured to obtain and transmit the audio data to the accessory device. The accessory device may be configured to determine the cardiac condition parameter indicative of a risk of cardiac arrest based on the audio data; determine whether one or more cardiac criteria are satisfied; and in accordance with a first cardiac criterion being satisfied, output a first warning signal, the first warning signal being indicative of the cardiac condition parameter. The accessory device may be configured to receive the audio data from the hearing aid and optionally forward or transmit the audio data or parts thereof to a server device or cloud service configured to determine the cardiac condition parameter indicative of a risk of cardiac arrest based on the audio data; and receive the cardiac condition parameter from the server device or cloud service. In other words, to determine a cardiac condition parameter may comprise to transmit the audio data to a server device or cloud service and receive the cardiac condition parameter from server device or cloud service.

In one or more example hearing systems, one or more cardiac criteria may be satisfied if the accessory device receives an alarm message from a server device or cloud service. In other words, a server device or cloud service may control or trigger the accessory device to output one or more warning signals including the first warning signal indicative of the cardiac condition parameter, e.g. in accordance with the server device or cloud service detecting an increased risk of cardiac arrest based on the audio data. In other words, the hearing system may comprise a server device or cloud service comprising at least one of the one or more processors.

In one or more example hearing systems, the one or more processors of the hearing system may be configured to determine a cardiac condition parameter or a plurality of cardiac condition parameters, such as a first cardiac condition parameter and/or a second cardiac condition parameter, based on the audio data. The cardiac condition parameter(s), such as the first cardiac condition parameter and/or the second cardiac condition parameter may be indicative of a risk of cardiac arrest.

In one or more example hearing systems, the first cardiac condition parameter may be indicative of information associated with high risk of cardiac arrest. In one or more example hearing systems, the first cardiac condition parameter may be indicative of information associated with low risk of cardiac arrest. In one or more example hearing systems, the first cardiac condition parameter may be indicative of information associated with no risk of cardiac arrest.

In one or more example hearing systems, the second cardiac condition parameter may be indicative of information associated with high risk of cardiac arrest. In one or more example hearing systems, the second cardiac condition parameter may be indicative of information associated with low risk of cardiac arrest. In one or more example hearing systems, the second cardiac condition parameter may be indicative of information associated with no risk of cardiac arrest.

In one or more example hearing systems, the cardiac condition parameter may be indicative of cardiac arrest risk to the user of the hearing aid and/or the user of the accessory device.

In one or more example hearing systems, the one or more processors of the hearing aid may be configured to determine the cardiac condition parameter indicative of a risk of cardiac arrest based on the audio data which is based on the microphone input signal from the first microphone of the hearing aid.

In one or more example hearing systems, the one or more processors of the accessory device may be configured to determine the cardiac condition parameter indicative of a risk of cardiac arrest based on the audio data which is based on the microphone input signal from the first microphone of the hearing aid. In one or more example hearing systems, the accessory device may be configured to obtain, via the interface, the audio data or at least a part of the audio data from the hearing aid.

In one or more example hearing systems, the one or more processors of the accessory device may be configured to determine the cardiac condition parameter indicative of a risk of cardiac arrest based on the audio data which is based on the microphone input signal from the first accessory device microphone of the accessory device.

The one or more processors are optionally configured to determine whether one or more cardiac criteria, such as a first cardiac criterion, a second cardiac criterion, and/or a third cardiac criterion, are satisfied. In one or more example hearing systems, the first cardiac criterion may comprise a first primary threshold, and/or a first secondary threshold. In one or more example hearing systems, the second cardiac criterion may comprise a second primary threshold and/or a second secondary threshold. In one or more example hearing systems, the third cardiac criterion may comprise a third primary threshold and/or a third secondary threshold.

In one or more example hearing systems, the one or more processors are configured to determine whether the cardiac condition parameter satisfies a cardiac criterion. In one or more example hearing systems, determining whether the cardiac condition parameter satisfies a cardiac criterion may comprise determining whether a cardiac condition parameter, such as a first cardiac condition parameter, is larger than or less than the first primary threshold. The first primary threshold may be set in reference to no risk of cardiac arrest. In one or more example hearing systems, the first primary threshold may be based on a predefined value and/or based on the user data. In one or more example hearing systems, determining whether the cardiac condition parameter satisfies a cardiac criterion may comprise determining whether cardiac condition parameter such as a first cardiac condition parameter is below the first secondary threshold. The first secondary threshold may be set in reference to no risk of cardiac arrest. In one or more examples the first secondary threshold may be based on a predefined value and/or based on the user data. In one or more example hearing systems, when the cardiac condition parameter such as the first cardiac condition parameter is below the first primary threshold and above the first secondary threshold then it may be considered as no risk of cardiac arrest.

In one or more example hearing systems, the one or more processors may be configured to determine the first primary threshold and/or the first secondary threshold based on the user data.

The one or more processors may be configured to output, optionally in accordance with a first cardiac criterion being satisfied, a first warning signal. In one or more example hearing systems, the first warning signal is indicative of the cardiac condition parameter. In other words, the one or more processors may be configured to output the first warning signal when the first cardiac condition parameter is above (or equal to) the first primary threshold. In one or more example hearing systems, the one or more processors may be configured to output the first warning signal when the first cardiac condition parameter is below (or equal to) the first secondary threshold.

In one or more example hearing systems, the hearing aid may be configured to obtain, via the interface, the audio data based on the first microphone input signal. The hearing aid may be configured to determine, by using one or more processors, the cardiac condition parameter indicative of cardiac arrest based on the audio data which is based on the first microphone input signal. The hearing aid may be configured to determine whether the cardiac condition parameter satisfies the first cardiac criterion.

In one or more example hearing systems, when the first cardiac criterion is satisfied by the cardiac condition parameter the one or more processors of the hearing aid may be configured to output a warning signal, such as a first warning signal indicative of the cardiac condition parameter. In one or more example hearing systems, the one or more processors of the hearing aid may be configured to output, via the interface, the first warning signal to the accessory device. In one or more examples, outputting the first warning signal by the one or more processors of the hearing aid may comprise to store meta data, e.g., timestamp of reception of audio data, the cardiac criterion, the threshold values, risk of cardiac arrest and/or mode of outputting the cardiac condition parameter, associated with the cardiac condition parameter in the memory of the hearing aid.

In one or more example hearing systems, outputting the first warning signal may comprise to generate an alert sound and/or alert message to alert the user of the hearing aid. In one or more example hearing systems, outputting, by the hearing aid, the first warning signal may comprise transmitting, via the interface, the first warning signal to the accessory device. In one or more example hearing systems, the accessory device may be configured to generate an alert sound/or alert message to alert the user of the hearing aid and/or the user of the accessory device.

In one or more example hearing systems, the accessory device may be configured to obtain, via the interface, from the hearing aid, the audio data based on the first microphone input signal. In one or more example hearing systems, the accessory device may be configured to determine, by using one or more processors, a cardiac condition parameter may be indicative of risk of cardiac arrest based on the audio data which is based on the first accessory device microphone input signal. In one or more example hearing systems, the accessory device may be configured to determine whether the cardiac condition parameter satisfies the first cardiac criterion. In one or more example hearing systems, when the first cardiac criterion is satisfied by the cardiac condition parameter, the one or more processors of the accessory device may be configured to output a warning signal, such as the first warning signal, being indicative of the cardiac condition parameter.

It is an advantage of the present disclosure that determining one or more of the one or more of cardiac condition parameters, determining whether the cardiac condition parameter satisfies the cardiac criteria, and outputting the warning signal by the accessory device reduces the processing load on the hearing aid which in turn improves the battery performance of the hearing aid.

In one or more examples, the one or more processors of the accessory device may be configured to output, via the interface, the first warning signal to the hearing aid.

In one or more examples, outputting the first warning signal by the one or more processors of the accessory device may comprise to store and/or transmit meta data, e.g., timestamp of reception of audio data from the hearing aid, the cardiac criterion and the threshold values, risk of cardiac arrest, and/or mode of outputting the cardiac condition parameter, associated with the cardiac condition parameter in the memory of the accessory device. In other words, the meta data may be transmitted to a centralized server/cloud service/database, e.g. for training of one or more models.

In one or more example hearing systems, outputting the first warning signal may comprise to generate an alert sound and/or alert message, e.g., by generating a sound through the first accessory device speaker and/or through the hearing aid speaker, and/or by displaying the on the screen of the accessory device, such as a mobile phone, to alert the user of the hearing aid and/or the user of the accessory device. In one or more example hearing systems, outputting the warning signal by the one or more processors of the accessory device may comprise transmitting, via the interface, the warning signal to the hearing aid. In one or more examples, the hearing aid may be configured to generate an alert sound/or message to notify the user of the hearing aid.

In one or more example hearing systems, when the first cardiac condition criterion not being satisfied, the one or more processors may be configured to obtain the audio data based on the microphone input signal. In other words, when the first cardiac criterion is not being satisfied by the first cardiac condition parameter then the one or more processors are configured to continue the audio data reception from the one or more microphones.

The one or more processors may comprise or implement a feature extractor. The feature extractor may take the audio data as input and output features of the audio data as output. The output of the feature extractor may be one or more spectrograms, such as N-channel Mel spectrogram(s) or N-channel FFT. In one or more examples, N is in the range from 12 to 128, such as in the range from 20 to 50.

The one or more processors may comprise or implement a first classifier, such as a first convolutional neural network, connected to the feature extractor, e.g. directly or via a compression module, such as a principal component analysis module. In other words, the output of the feature extractor may be fed as input to the first classifier or to a compression module.

The first classifier may be a respiratory classifier configured to classify, determine, and output one or more respiratory characteristics including first respiratory characteristic RC_1 and/or second respiratory characteristic RC_2. The output of the first classifier is optionally based on first classifier input from the feature extractor and/or the compression module. The first classifier may be configured to determine M respiratory characteristics, where M is 1, 2, 3, 4, or more. In one or more example hearing systems, M is in the range from 2 to 5.

A respiratory characteristic, such as the first respiratory characteristic or the second respiratory characteristic, may be indicative of "No breathing", such as a likelihood of the user not breathing.

A respiratory characteristic, such as the first respiratory characteristic or the second respiratory characteristic, may be indicative of "Gasping", such as a likelihood of the user gasping or a likelihood of the user having agonal breathing.

A respiratory characteristic, such as the first respiratory characteristic, the second respiratory characteristic or a third respiratory characteristic, may be indicative of "Deep breathing", such as a likelihood of the user breathing deeply or a likelihood of the user having deep breathing.

A respiratory characteristic, such as the first respiratory characteristic, the second respiratory characteristic, the third respiratory characteristic, or a fourth respiratory characteristic, may be indicative of "Rapid breathing" or "Hyperventilation", such as a likelihood of the user hyperventilating or a likelihood of the user having rapid breathing.

The one or more processors may comprise or implement a compression module for provision of an output that is optionally fed as input to the first classifier. The compression module may implement or comprise principal component analysis (PCA) and/or an autoencoder.

The first classifier may be configured to classify or determine one or more respiratory characteristics based on a first classifier input, such as the output of the feature extractor and/or the output of the compression module. In other words, the first classifier may be a respiratory classifier. The first classifier may implement or comprise a support vector machine, a convolutional neural network (CNN), a recurrent neural network (RNN) or any combination thereof.

The one or more processors may comprise or implement a text extractor, such as a recurrent neural network, connected to the feature extractor, e.g. directly or via one or more intermediate modules. In other words, the output of the feature extractor may be fed as input to the text extractor. The text extractor may be configured to perform speech recognition, e.g. transform speech or audio to a text output.

The one or more processors may comprise or implement a speech analyser connected to the text extractor, e.g. directly or via one or more intermediate modules. In other words, the output of the text extractor may be fed as input to the speech analyser. The speech analyser may be configured to determine and output one or more speech characteristics, such as one or more of a speech pitch, word speed, a change in word speed, a word count, a change in word count, a phrase count, a presence of a word, a presence of a sentence, and a presence of mumble.

The speech analyser may comprise a text analyser for provision of one or more word characteristics, such as a word count, based on the text output from the text extractor. The one or more word characteristics may be fed as output from the speech analyser. In other words, the one or more speech characteristics may comprise one or more word characteristics, such as a word count. In one or more example hearing systems, the text analyser may implement or comprise a support vector machine, a convolutional neural network (CNN), a recurrent neural network (RNN) or any combination thereof. The text analyser may implement or comprise a buffer component, e.g. for collecting historic data, for example for detection of changes in one or more of pitch speed, word speed, and word count.

The speech analyser may comprise a word embedding module, a sentence collector, and a second classifier for provision of one or more sentence characteristics. The sentence characteristic may be indicative of a coherence between sentences as collected by the sentence collector. The word embedding module is connected to the text extractor for receiving the text output as input. The word embedding module is optionally configured to embed and separate the words in text strings for provision of a text string output, e.g., to the sentence collector. The sentence collector is configured to determine and collect sentences based on the text strings/text string output from the word embedding module for provision of a sentence output. The sentence output and/or the text string output may be fed as second classifier input to the second classifier.

The second classifier may be configured to classify or determine one or more sentence characteristics, such as coherence between sentences and/or text strings, based on second classifier input, such as the sentence output and/or the text string output. In other words, the second classifier may be a coherence classifier. The one or more sentence characteristics may be fed as output from the speech analyser. In other words, the one or more speech characteristics may comprise one or more sentence characteristics, such as a sentence coherence.

Accordingly, the one or more processors may comprise or implement a second classifier, such as a second convolutional neural network, connected to the feature extractor, e.g. directly or via word embedding module and/or sentence collector. The second classifier may implement or comprise a support vector machine, a convolutional neural network (CNN), a recurrent neural network (RNN) or any combination thereof.

The one or more processors may comprise or implement a cardiac arrest module configured to determine the cardiac condition parameter. The cardiac arrest module is connected to one or more, such as all, of the first classifier, the speech analyser, a motion data source, a user data source, and a body data source. In one or more example hearing systems, the cardiac arrest module is configured to determine the cardiac condition parameter based on respiratory characteristic(s) from the first classifier and speech characteristic(s), such as word characteristic(s) and/or sentence characteristic(s), from the speech analyser. Optionally, the cardiac arrest module is configured to determine the cardiac condition parameter based on motion data from the motion data source, such as one or more motion sensors. Optionally, the cardiac arrest module is configured to determine the cardiac condition parameter based on user data from the user data source. Optionally, the cardiac arrest module is configured to determine the cardiac condition parameter based on body data from the body data source, such as one or more body sensors. In one or more example hearing systems, the cardiac arrest module is configured to determine the cardiac condition parameter based on respiratory characteristic(s), speech characteristic(s), motion data, user data and body data or a combination thereof.

The cardiac arrest module may comprise or implement a machine learning model and/or one or more neural networks.

The machine learning model may be a tree bagging model, such as a random forest model. The tree bagging model may be implemented as a regressor or a classifier.

The machine learning model may be a gradient boosted tree model, such as an XGBoost model. The gradient boosted tree model may be implemented as a regressor or a classifier.

The cardiac arrest module may implement or comprise a support vector machine, a convolutional neural network (CNN), a recurrent neural network (RNN) or any combination thereof.

In one or more example hearing systems, determining a cardiac condition parameter, based on the audio data, comprises to determine one or more speech characteristics including a first speech characteristic based on the audio data. In other words, a first speech characteristic may be used as the cardiac condition parameter or the cardiac condition parameter may be based on a first speech characteristic.

In one or more example hearing systems, determining a cardiac condition parameter may be based on the first speech characteristic. In one or more example hearing systems, determining a cardiac condition parameter, based on the audio data, comprises to determine one or more speech characteristics including a second speech characteristic based on the audio data. In one or more example hearing systems, determining a cardiac condition parameter is based on the second speech characteristic.

In one or more example hearing systems, the one or more processors may be configured to determine one or more speech characteristics including the first speech characteristic based on the audio data which is based on the microphone input signal such as the first microphone input signal and/or the first accessory device microphone input signal. In one or more example hearing systems, the one or more processors may be configured to determine the cardiac condition parameter based on the first speech characteristic.

In one or more example hearing systems, the hearing aid or the accessory device may be configured to determine the first speech characteristic based on the audio data which is based on the first microphone input signal.

In one or more example hearing systems, the accessory device may be configured to determine the first speech characteristic based on the audio data which is based on the first accessory device microphone input signal.

In one or more example hearing systems, the hearing aid may be configured to determine the cardiac condition parameter based on the first speech characteristic which is based on the audio data which is based on the first microphone input signal.

In one or more example hearing systems, the accessory device may be configured to determine the cardiac condition parameter based on the first speech characteristic which is based on the audio data which is based on the first microphone input signal.

In one or more example hearing systems, the accessory device may be configured to determine the cardiac condition parameter based on the first speech characteristic which is based on the audio data which is based on the first accessory device microphone input signal.

In one or more example hearing systems, the first speech characteristic is selected from a speech pitch, word speed, a change in word speed, a word count, a change in word count, a phrase count, a presence of a word, a presence of a sentence, and/or a presence of mumble.

A speech pitch may be seen as a speech characteristic such as the first speech characteristic of the audio data based on the microphone input signal such as the first microphone input signal and/or the accessory device microphone input signal. In one or more example hearing systems, the one or more processors may be configured to determine, based on the audio data, the speech pitch of the user.

In one or more example hearing systems, the one or more processors may be configured to determine a change in the speech pitch. In other words, the one or more processors may be configured to determine, based on the audio data, rise in speech pitch and/or fall in speech pitch in comparison to user's normal pitch. In one or more example hearing systems, the one or more processors may be configured to determine the cardiac condition parameter based on the speech pitch.

In one or more example hearing systems, the first speech characteristic may be selected from one or more tonal characteristics, such as tone of a voice, rhythm of a voice, resonance of a voice, tempo of a voice, texture of a voice. The voice may be seen as speech of the user of the hearing aid and/or accessory device of the user. In one or more example hearing systems, the one or more processors may be configured to determine the cardiac condition parameter based on the one or more tonal characteristics.

A word speed may be seen as a speech characteristic such as the first speech characteristic of the audio data based on the microphone input signal, such as the first microphone input signal and/or the accessory device microphone input signal. In one or more example hearing systems, the one or more processors may be configured to determine, based on the audio data, the word speed. In other words, the one or more processors may be configured to determine, based on the audio data, the word speed indicative of time taken by a user to utter a word. In one or more examples, the word speed may be represented as 1 word/second, 1 word/0.5 seconds, 1 word/0.1 seconds, etc.

In one or more example hearing systems, the one or more processors may be configured to determine the cardiac condition parameter based on the word speed.

A change in word speed may be seen as a speech characteristic, such as the first speech characteristic of the audio data based on the microphone input signal, such as the first microphone input signal and/or the accessory device microphone input signal. In one or more example hearing systems, the one or more processors may be configured to determine, based on the audio data, a change in word speed. In other words, the one or more processors may be configured to determine, based on the audio data, a change in word speed indicative of a change in time to utter a word by the user in comparison to a word speed threshold.

In one or more examples, the word speed threshold may be seen as an average time taken to utter one or more words (such as 1 word/second, 1 word/0.5 seconds, 1 word/0.1 seconds, etc). In one or more example hearing systems, the one or more processors are configured to determine the word speed threshold based on the audio data.

In one or more example hearing systems, the one or more processors may be configured to determine the cardiac condition parameter based on the change in word speed.

A word count may be seen as a speech characteristic, such as the first speech characteristic of the audio data based on the microphone input signal such as the first microphone input signal and/or the accessory device microphone input signal. In one or more example hearing systems, the one or more processors may be configured to determine, based on the audio data, the word count. In other words, the one or more processors may be configured to determine, based on the audio data, the word count indicative of number of words spoken by the user, such as the user of the hearing aid and/or the user of the hearing aid, during a time period. In one or more examples, the word count may be represented as number of words spoken over a period of time, for example, 300 words/2 minutes, less than 100 words/1 minute, 50 words/30 seconds, and 1 word/0.5 seconds, etc.

In one or more example hearing systems, the one or more processors may be configured to determine the cardiac condition parameter based on the word count.

A change in word count may be seen as a speech characteristic, such as the first speech characteristic of the audio data based on the microphone input signal, such as the first microphone input signal and/or the accessory device microphone input signal. In one or more example hearing systems, the one or more processors may be configured to determine, based on the audio data, a change in word speed. In other words, the one or more processors may be configured to determine, based on the audio data, a change in word speed indicative of a change in number of words spoken by the user, e.g., by the user of the hearing aid and/or the user of the hearing aid, during a time period in comparison to a word threshold. In one or more examples, the word threshold may be seen as an average rate at which a user utters words, such as 0 to 50 words per minute, 50 to 100 words per minute, 100 to 130 words per minutes, and/or 100 to 200 words per minute, etc.

In one or more example hearing systems, the one or more processors may be configured to determine the word threshold based on the audio data. In one or more example hearing systems, the one or more processors may be configured to determine the cardiac condition parameter based on the change in word speed.

A phrase count may be seen as a speech characteristic, such as the first speech characteristic of the audio data based on the microphone input signal such as the first microphone input signal and/or the accessory device microphone input signal. In one or more example hearing systems, the one or more processors may be configured to determine, based on the audio data, the phrase count. In other words, the one or more processors may be configured to determine, based on the audio data, the phrase count indicative of number of phrases spoken by the user, e.g., the user of the hearing aid and/or the user of the hearing aid, during a time period. In one or more examples, the phrase count may be represented as number of phrases spoken over a period of time, for example, 300 phrases/4 minutes, less than 100 phrases/2 minute, 10 phrase/20 seconds, and 1 phrase/second, etc.

In one or more example hearing systems, the one or more processors may be configured to determine the cardiac condition parameter based on the phrase count.

A presence of a word may be seen as a speech characteristic, such as the first speech characteristic of the audio data based on the microphone input signal, such as the first microphone input signal and/or the accessory device microphone input signal. In one or more example hearing systems, the one or more processors may be configured to determine, based on the audio data, the presence of a word. In other words, the one or more processors may be configured to determine, based on the audio data, presence of a word indicative of a specific word spoken by the user. In one or more examples, the presence of a word may be seen as a presence of a particular word or a presence of a word from a set of words, e.g., help, feel, pain, heart, left, hand, breath, stress, feel, walk, heavy, tough, sweat, call, emergency, 112, and/or 911, etc.

In one or more example hearing systems, the one or more processors may be configured to perform natural language processing to identify a word spoken by the user.

In one or more example hearing systems, the one or more processors may be configured to perform a speech to text conversion for provision of the cardiac condition parameter.

In one or more example hearing systems, the one or more processors may be configured to determine the cardiac condition parameter based on the presence of a word.

A presence of a sentence may be seen as a speech characteristic, such as the first speech characteristic of the audio data based on the microphone input signal such as the first microphone input signal and/or the accessory device microphone input signal. In one or more example hearing systems, the one or more processors may be configured to determine, based on the audio data, the presence of a sentence. In other words, the one or more processors may be configured to determine, based on the audio data, presence of a sentence indicative of a specific sentence spoken by the user. In one or more examples, the presence of a sentence may be seen as presence of a particular sentence, e.g., 'I feel heart pain', 'I need help', 'I think, I may have a cardiac arrest', 'I have pain on my left side', 'I can't breathe', 'please help me', 'call emergency', 'call 112', etc.

In one or more example hearing systems, the one or more processors may be configured to determine the cardiac condition parameter based on the presence of a sentence.

A mumble or presence of mumble may be seen as a speech characteristic, such as the first speech characteristic of the audio data obtained from the microphone input signal such as the first microphone input signal and/or the accessory device microphone input signal. In one or more example hearing systems, the one or more processors may be configured to determine, based on the audio data, the presence of mumbling. In other words, the one or more processors may be configured to determine, based on the audio data, the presence of one or more mumbled words and/or one or more mumbled sentences spoken by the user, e.g., the user of the hearing aid and/or the user of the hearing aid. In one or more examples, the mumbling of words and/or sentences may be seen as unclear speech. In one or more examples, the mumbling of words and/or sentences may be indicative of difficulty in uttering the words and/or sentences by the user. In other words, the user may not be in capacity to say the words and/or sentences properly.

In one or more example hearing systems, the one or more processors may be configured to determine the cardiac condition parameter based on the presence of mumble in audio data.

In one or more example hearing systems, determining one or more speech characteristics comprises to determine a second speech characteristic based on the audio data. In one or more example hearing systems, determining a cardiac condition parameter is based on the second speech characteristic.

In one or more example hearing systems, the one or more processors are configured to determine the cardiac condition parameter based on the second speech characteristic and/or the first speech characteristic.

In one or more example hearing systems, the second speech characteristic is different from the first speech characteristic and is selected from a word speed, a change in word speed, a word count, a change in word count, a phrase count, a presence of a word, a presence of a sentence, and a presence of mumble.

In one or more example hearing systems, the one or more processors may be configured to determine the cardiac condition parameter based on the second speech characteristic and the first speech characteristic. In one or more example hearing systems, the one or more processors may be configured to determine the cardiac condition parameter based on the first speech characteristic and the second speech characteristic which may be different from first speech characteristic, for example, the one or more processors are configured to determine the cardiac condition parameter based the word speed, may be seen as a first speech characteristic, and a change in word count, may be seen as a second speech characteristic.

In one or more example hearing systems, determining one or more speech characteristics comprises to convert the audio data to text data also denoted text output. In one or more example hearing systems, determining one or more speech characteristics, such as the first speech characteristic and/or the second speech characteristic, is based on the text data/text output.

In one or more example hearing systems, determining one or more speech characteristics, by the one or more processors, may comprise to convert the audio data to text data indicative of a text, e.g., a symbol, a letter, a word, a phrase, a sentence, a default message, an emergency message, etc.

In one or more example hearing systems, the one or more processors may be configured to determine the cardiac condition parameter based on the text data. In other words, the one or more processors are configured to convent the audio data to text data indicative text in one or more languages, e.g., English, French, Danish, Chinese, and Arabic, etc. In one or more example hearing systems, the accessory device and/or the hearing aid may be configured to transmit the text data to a second accessory device, such as a mobile phone, a tablet, and/or a wearable watch.

In one or more example hearing systems, determining a cardiac condition parameter based on the audio data comprises to determine one or more respiratory characteristics including a first respiratory characteristic based on the audio data.

In one or more example hearing systems, determining a cardiac condition parameter is based on the first respiratory characteristic.

In one or more example hearing systems, the one or more processors may be configured to determine, based on the audio data, one or more respiratory characteristics, such as a first respiratory characteristic, and/or a second respiratory characteristic. In one or more example hearing systems, determining a cardiac condition parameter, by the one or more processors, is based on the first respiratory characteristic and/or the second respiratory characteristic.

A respiratory characteristic, such as the first respiratory characteristic and/the second respiratory characteristic, may be indicative of characteristic of the hearing aid user's respiration. In one or more examples, a respiratory characteristic, such as the first respiratory characteristic and/or the second respiratory characteristic, may be indicative of characteristic of the accessory device user's respiration.

In one or more example hearing systems, the first respiratory characteristic is selected from a breathing cycle length, a change in breathing cycle length, and breathing depth.

In one or more example hearing systems, the second respiratory characteristic is selected from a breathing cycle length, a change in breathing cycle length, and breathing depth.

A breathing cycle length may be seen as a respiratory characteristic such as the first respiratory characteristic associated with the audio data based on the microphone input signal such as the first microphone input signal and/or the accessory device microphone input signal. In one or more examples, the breathing cycle comprises a breathing action. The breathing action may comprise an air inhale and/and air exhale. In one or more examples, the breathing action may be performed by the user of the hearing aid and/or the user of the accessory device. In one or more examples, the breathing cycle may be represented as time taken by the user to inhale the air or time taken by the user to exhale the air. In one or more examples, the breathing cycle may be represented as time taken by the user to inhale the air and time taken by the user to exhale the air. In one or more examples, the breathing cycle length may be represented in terms of time taken by the user to complete one or more cycles, for examples 18 cycles/1 minutes, 1 cycle/2 seconds, 10 cycles/5 seconds, 1 cycle/10 seconds, etc.

In one or more example hearing systems, the one or more processors are configured to determine a breathing cycle length based on the audio data.

In one or more example hearing systems, the one or more processors are configured to determine a cardiac condition parameter based on the breathing cycle length.

A change in breathing cycle length may be seen as a respiratory characteristic such as the first respiratory characteristic associated with the audio data based on the microphone input signal such as the first microphone input signal and/or the accessory device microphone input signal. In one or more examples, the change in breathing cycle may comprise a change in breathing action. The breathing action may comprise an air inhale and/and air exhale. In one or more examples, the change in breathing cycle may be represented as a change in time to inhale the air and/or exhale the air by the user of the hearing aid and/or the accessory device in reference to an average cycle length. In one or more examples, the average cycle length may be determined, by the one or more processors, based on the user data. In one or more examples, the average cycle length may be a pre-determined value.

In one or more example hearing systems, the one or more processors are configured to determine a change in breathing cycle length based on the audio data.

In one or more example hearing systems, the one or more processors are configured to determine a cardiac condition parameter based on the change in breathing cycle length.

Breathing depth may be seen as a respiratory characteristic such as the first respiratory characteristic associated with the audio data obtained from the microphone input signal such as the first microphone input signal and/or the accessory device microphone input signal. In one or more examples, the breathing depth is associated with a breathing action. The breathing action may comprise an air inhale and/and air exhale.

In one or more examples, the breathing depth may be represented as time taken by the user to inhale the air. In one or more examples, the breathing depth may be represented in terms of time taken by the user for one air inhale action, for examples 1 air inhale/10 seconds, 1 air inhale/5 seconds, 1 air inhale/1 second, 1 air inhale/0.5 second, etc.

In one or more example hearing systems, the one or more processors are configured to determine breathing depth based on the audio data.

In one or more example hearing systems, the one or more processors are configured to determine a cardiac condition parameter based on the breathing depth.

In one or more example hearing systems, the hearing aid and/or the accessory device comprises a motion sensor for provision of motion data. In one or more example hearing systems, the one or more processors of the hearing system are configured to determine a cardiac condition parameter indicative of a risk of cardiac arrest based on the motion data.

In one or more example hearing systems, the one or more processors may be configured to obtain motion data from the motion sensor. In one or more example hearing systems, the hearing aid may comprise one or more motion sensors. In one or more example hearing systems, the accessory device may comprise one or more motion sensors. In one or more example hearing systems, the hearing system may be configured to determine an action performed by the user of the accessory device and/or the electronic device. In one or more examples, the action may be seen as a user walking, jogging, running, climbing, swimming, sitting, standing up, moving hand, moving leg, shaking, shivering, taking a step, holding an object, falling, stumbling, tripping, passing out, etc.

In one or more example hearing systems, the hearing system may comprise a second accessory device such an electronic device comprising a processor, a memory, interface, one or more transducers, one or more transceivers and/or one or more sensors including a second motion sensor. In one or more examples, the second accessory device may be seen as a wearable electronic device, such as a smart watch, smart wrist band, and/or a body-based motion sensor, such as a chest wrapped motion sensor. In one or more example hearing systems, the one or more processors are configured to obtain motion data from the second accessory device. In one or more example hearing systems, the one or more processors are configured to determine a cardiac condition parameter based on motion data obtained from the second accessory device.

In one or more example hearing systems, the one or more processors may be configured to control the motion sensor for provision of the motion data. In one or more example hearing systems, the one or more processors may be configured to obtain motion data from the motion sensor(s) dynamically. In one or more example hearing systems, the one or more processors may be configured to obtain motion data from the motion sensor(s) periodically. In one or more example hearing systems, the one or more processors may be configured to obtain the motion data via the interface and/or via the transceiver.

In one or more example hearing systems, the one or more processors may be configured to determine a cardiac condition parameter based on the motion data.

In one or more example hearing systems, the hearing aid comprises a body sensor for provision of body data. In one or more example hearing systems, the one or more processors of the hearing system are configured to determine a cardiac condition parameter indicative of a risk of cardiac arrest based on the body data.

In one or more example hearing systems, the one or more processors may be configured to obtain the body data, e.g., via the interface and/or via the transceiver, from the body sensor. In one or more examples, the body sensor may be seen as an electronic device that is capable to measure one or more body parameters of the user of the hearing aid and/or the user of the accessory device. In one or more examples the one or more body parameters may comprise one or more of a temperature parameter indicative of user's body temperature, a muscle contraction parameter indicative of a user's muscle contraction, and a neural parameter indicative of user's brain activity.

In one or more example hearing systems, the hearing system may comprise the second accessory device such an electronic device comprising a processor, a memory, interface and one or more sensors including a second body sensor. In one or more examples, the second accessory device may be seen as a wearable electronic device, such as a smart watch comprising a heart rate sensor, smart wrist band comprising a heart rate sensor, and/or a body sensor, such as an EEG sensor, and/or an EMG sensor. In one or more examples, the one or more processors are configured to obtain the body data from the second accessory device.

In one or more example hearing systems, the one or more processors may be configured to control the body sensor for provision of the body data. In one or more example hearing systems, the one or more processors may be configured to obtain the body data from the body sensor dynamically. In one or more example hearing systems, the one or more processors may be configured to obtain the body data from the body sensor periodically.

In one or more example hearing systems, the one or more processors may be configured to determine a cardiac condition parameter based on the body data.

In one or more example hearing systems, the hearing system is configured to obtain user data. In one or more example hearing systems, the one or more processors of the hearing system are configured to determine a cardiac condition parameter indicative of a risk of cardiac arrest based on the user data.

In one or more example hearing systems, the hearing system comprising the one or more processors may be configured to obtain the user data from one or more servers, e.g., a data base server, a patient data base server, a cloud source, and/or a user data base server. In one or more examples, the one or more processors may be configured to obtain the user data from the accessory device. In one or more example hearing systems, the accessory device and/or the hearing aid may be configured to store the user data in a part of the memory.

In one or more examples, the user data may comprise user information such as gender, age, height, weight, ethnicity, habits, e.g., smoking, drinking alcohol, consuming tobacco, and/or drugs, user activities, e.g., type of job, workouts, type of workouts, and/or gym schedule, and/or health related information, e.g., previous or current heart related issues, previous or ongoing medication information, and/or vaccination information.

In one or more example hearing systems, outputting a first warning signal may comprise to transmit a first primary warning signal via a receiver of the hearing aid and/or wirelessly transmit a first secondary alarm signal via a transceiver of the hearing system.

In one or more example hearing systems, the hearing aid and/or the accessory device may comprise an interface which may comprise one or more transceivers.

In one or more example hearing systems, the hearing aid comprising the one or more processors may be configured to output the first warning signal. In one or more examples, the first warning signal may comprise a first primary warning signal, and/or a first secondary alarm signal. In one or more examples, the first warning signal may be seen as a warning signal indicative of potential risk of cardiac arrest. In one or more examples, the first primary warning signal may be outputted as a sound by the hearing aid or by the accessory device or as a warning display message by the accessory device.

In one or more example hearing systems, the one or more processors may be configured to transmit the first primary warning signal to the second accessory device such as a smart watch. In one or more example hearing systems, the one or more processors may be configured to transmit the first primary warning signal to a third electronic device such as a TV, a tablet, and/or a display.

In one or more example hearing systems, outputting the first warning signal may comprise transmitting the first primary warning signal via the transceiver of the hearing aid. In one or more example hearing systems, outputting the first warning signal may comprise transmitting the first primary warning signal via the transceiver of the accessory device.

In one or more example hearing systems, the hearing system may comprise a transceiver. In one or more example hearing systems, the hearing system may be configured to transmit, via the transceiver of the hearing system, the first secondary alarm signal. In one or more examples, the first secondary alarm signal may be seen as a sound that alerts the user regarding the risk of cardiac arrest. In one or more examples, the sound alert may be seen as a high pitch alert tone, and a pre-recorded tone.

In one or more example hearing systems, the one or more processors may be configured to transmit the first secondary alarm signal to the second accessory device such as a smart speaker. In one or more example hearing systems, the one or more processors are configured to transmit the first secondary alarm signal to the third electronic device such as a TV, a tablet, and/or a speaker.

In one or more example hearing systems, outputting the first warning signal may comprise transmitting the first secondary alarm signal via the transceiver of the hearing aid. In one or more example hearing systems, outputting the first warning signal may comprise transmitting the first secondary alarm signal via the transceiver of the accessory device.

In one or more example hearing systems, the hearing system may be configured to output the warning signal to a third accessory device, such as an electronic device used by user's family member, and/or by an acquaintance. In other words, the hearing system may be configured to transmit a first warning signal to the third accessory device, wherein the third accessory device may belong to a family member of the user of the hearing aid.

In one or more example hearing systems, the hearing system may be configured to transmit, based on the cardiac condition parameter, a 'save our soles', SOS, message to the emergency response teams, e.g., paramedics, ambulance, air ambulance, etc.

In one or more example hearing systems, the hearing aid and/or the accessory device may be configured to obtain, via a transducer, a user voice command in response to the cardiac condition parameter output. In other words, the user of the hearing aid and/or the accessory device may utter a voice command, such as 'call emergency', 'call the doctor', 'call the contact', 'send SOS message' etc, in response to the cardiac condition parameter, for example when the risk of cardiac arrest is high.

In one or more example hearing systems, the hearing aid and/or the accessory device may comprise a cardiac arrest prediction model. The cardiac arrest prediction model may be seen as a machine learning model. In one or more examples, the machine learning model is a trained neural network or comprises one or more neural networks, such as a plurality of neural networks. In one or more examples, the machine learning model is a deep neural network. In one or more examples, the deep neural network may be trained dynamically while the user is using the hearing aid and/or the accessory device. In one or more examples, the deep neural network may be trained based on the audio data, user data, body data, and/or motion data associated with the user of the accessory device and/or the hearing aid.

In one or more example hearing systems, executing the neural network in the accessory device may reduce the processing load on the hearing aid which in turn helps to improve the performance of the hearing aid, e.g., by reducing the processing load on processors in the hearing aid.

In one or more example hearing systems, the machine learning model, such as the deep neural network, may be executed in a server or cloud service connected to the accessory device and/or the hearing aid. In one or more example hearing systems, executing the deep neural network(s) or other machine learning models in the server may reduce the processing load on the hearing system which in turn helps to improve the performance of the hearing system, such as by reducing the processing load on processors.

In one or more example hearing systems, the hearing system, such as the one or more processors, may comprise or implement a neural network, such as a CNN or an RNN, or a plurality of neural networks, such as one or more CNNs and/or one or more RNNs. A neural network may comprise one or more input layers, one or more intermediate layers, and one or more output layers. In one or more example hearing systems, the input to the one or more input layers may comprise one or more of the audio data, user data, motion data, and body data. In one more example hearing systems, the neural network(s) and/or machine learning model(s) may determine and output the cardiac condition parameter indicative of cardiac arrest risk. In other words, the cardiac arrest prediction model may be configured to determine a cardiac condition parameter based on one more of audio data, user data, motion data, and body data.

In one or more example hearing systems, the one or more processors are configured to output the cardiac condition parameter. In one or more example hearing systems, outputting the cardiac condition parameter comprises transmitting the cardiac condition parameter to the second accessory device, to the third accessory device, and/or to the server.

In one or more example hearing systems, outputting the cardiac condition parameter comprises storing the cardiac condition parameter in a part of memory of the hearing aid. In one or more example hearing systems, outputting the cardiac condition parameter comprises storing the cardiac condition parameter in a part of memory of the accessory device. In one or more example hearing systems, outputting the cardiac condition parameter comprises displaying a user interface element indicative of the cardiac condition parameter, e.g. on a display of the accessory device.

In one or more example hearing systems, the hearing system may comprise one or more machine learning models (MLs), such as Random forest, and/or XGBoost. In other words, the one or more processors may be configured to apply or implement one or more machine learning models.

FIG. 1 shows an example hearing system 1 according to the present disclosure. The hearing system can include a user 2. The hearing system 1 include a hearing aid 4 and an accessory device 6. The hearing aid 4 and the accessory device 6 includes one or more processors configured to perform at least some of the operations, features and steps as disclosed herein. The hearing system 1 optionally comprises a server 8. The server 8 is configured for communication with the accessory device 6 via communication link 12. The hearing aid 4 comprises a processor, a memory, an interface, and/or one or more transducers, such as a microphone and/or a receiver. The interface of the hearing aid may include a transceiver. The accessory device 500 may include a processor, a memory, an interface, and optionally one or more transducers, such as a microphone and/or a speaker. The interface of the accessory device may include a transceiver and/or a display. The hearing aid 4 and/or the accessory device 6 may include one or more motion sensors, such as an accelerometer, gyroscope, and/or a GPS for provision of motion data to the one or more processors. The hearing aid 4 and/or the accessory device 6 may include one or more body sensors, such as a PPG sensor and/or an EEG sensor.

The hearing aid 4 may be configured to communicate with the accessory device 6 via communication link 10. The communication link 10 may be a wired connection. The communication link 10 may be a wireless connection. The accessory device 6 may be configured to communicate with the server 8 via communication link 12. The communication link 12 may be a wired connection, a wireless connection or a combination thereof.

The hearing aid 4 comprises a microphone for provision of a microphone input signal, and one or more processors of the hearing system 1 are configured to obtain audio data based on the microphone input signal; determine a cardiac condition parameter indicative of a risk of cardiac arrest based on the audio data; determine whether one or more cardiac criteria are satisfied; and in accordance with a first cardiac criterion being satisfied, output a first warning signal, the first warning signal being indicative of the cardiac condition parameter.

Figure 2:
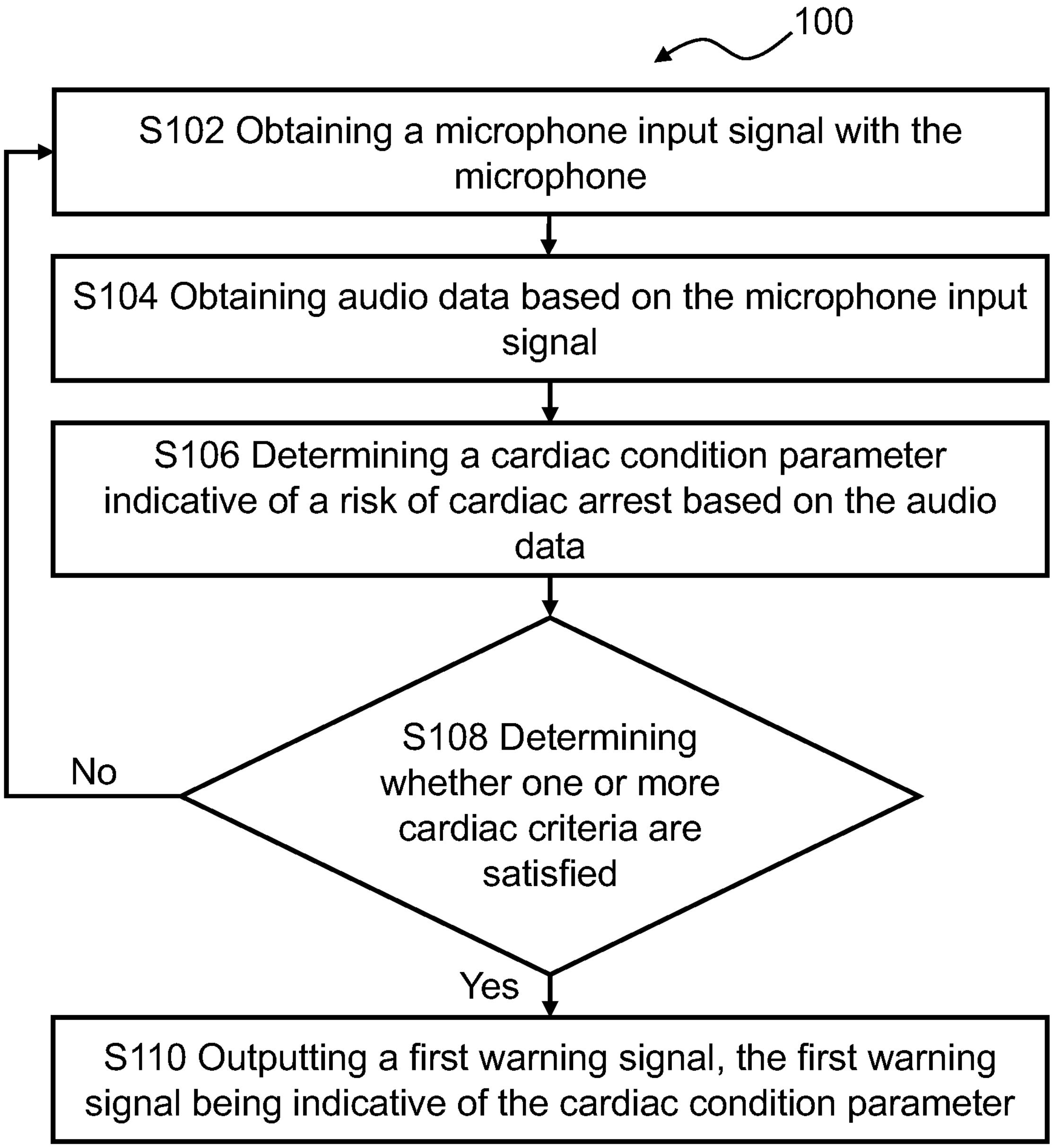
FIG. 2 is a flow diagram of an example method according to the disclosure, and FIG. 3 schematically illustrates example one or more processors according to the disclosure.

The hearing system 1 disclosed herein is configured to perform any of the methods disclosed in FIG. 2.

It will be understood that all the internal components of the hearing aid and the accessory device have not been shown in the FIG. 1, and the disclosure should not be limited to the components shown in the FIG. 1.

FIG. 2 is a flow diagram of an example method 100, performed by a hearing system comprising a hearing aid according to the disclosure. The method 100 may be a method for determining a cardiac condition parameter indicative of risk of cardiac arrest. The method 100 may be performed by the hearing aid comprising a microphone disclosed herein, such as the hearing aid 4 of FIG. 1.

The method 100 comprises obtaining S102 a microphone input signal with the microphone. The method 100 comprises obtaining S104 audio data based on the microphone input. The method 100 comprises determining S106 a cardiac condition parameter indicative of a risk of cardiac arrest based on the audio data. The method 100 comprises determining S108 whether one or more cardiac criteria are satisfied.

The method 100 comprises, in accordance with a first cardiac criterion being satisfied, outputting a first warning signal, the first warning signal being indicative of the cardiac condition parameter.

FIG. 3 illustrates an example architecture of a processing unit/one or more processors 200 according to the present disclosure.

The one or more processors 200 are configured obtain audio data 202 based on a microphone input signal. The one or more processors 200 comprises a feature extractor 204. The feature extractor 204 is configured to receive the audio data 202 as input, determine features 206, such as an N-channel Mel spectrogram, of the audio data, and output features 206 of the audio data as output.

The one or more processors 200 comprises a first classifier 208 being a first convolutional neural network connected to the feature extractor 204 directly or as shown via optional compression module 210. The compression module 210 is configured to compress the features 206 of the audio data for provision of an output requiring a simpler and computationally less complex first classifier 208. The compression module 210 may be a principal component analysis module for provision of one or more principal components as input to the first classifier 208.

The first classifier 208 is a respiratory classifier configured to classify, determine, and output one or more respiratory characteristics including first respiratory characteristic RC_1 and/or second respiratory characteristic RC_2 based on first classifier input from the compression module 210. The first classifier 208 may be configured to determine M respiratory characteristics, where M is 1, 2, 3, 4, or more. In one or more example hearing systems, M is in the range from 2 to 5. In the example shown in FIG. 3, the first classifier 208 is configured to classify, determine, and output at least two respiratory characteristics, such as at least two of a first respiratory characteristic indicative of "No breathing", such as a likelihood of the user not breathing; a second respiratory characteristic indicative of "Gasping", such as a likelihood of the user gasping or a likelihood of the user having agonal breathing; a third respiratory characteristic indicative of "Deep breathing", such as a likelihood of the user breathing deeply or a likelihood of the user having deep breathing; and a fourth respiratory characteristic indicative of "Rapid breathing" or hyperventilation", such as a likelihood of the user hyperventilating or a likelihood of the user having rapid breathing.

The one or more processors 200 comprises a text extractor 212, such as a recurrent neural network, connected to the feature extractor 204, and the features 206 of the audio data are fed as input to the text extractor 212. The text extractor 212 is configured to perform speech recognition and provide a text output 214 representative of speech in the audio data 202/features 206.

The one or more processors 200 comprises a speech analyser 216 connected to the text extractor 212. In other words, the text output 214 of the text extractor 212 is fed as input to the speech analyser 216. The speech analyser 216 is configured to determine and output one or more speech characteristics including first speech characteristic SC_1 and/or second speech characteristic SC_2 based on features 214 from the feature extractor 212. The speech classifier 216 may be configured to determine and output K speech characteristics SC_1, SC_2, . . . , SC_K, where K is 1, 2, 3, 4, or more. In one or more example hearing systems, K is in the range from 2 to 5.

The speech analyser 216 optionally comprises a text analyser 218 for provision of one or more word characteristics including a first word characteristic WC_1, such as a word count, word speed or a word presence, based on the text output 214 from the text extractor 212. The first word characteristic WC_1 is output as the first speech characteristic SC_1 from the speech analyser 216. A plurality of word characteristics, such as two, three or more word characteristics may be included in the speech characteristics. In other words, the one or more speech characteristics may comprise two, three or more word characteristics.

The speech analyser 216 optionally comprises one or more of a word embedding module 220, a sentence collector 222, and a second classifier 224 for provision of one or more sentence characteristics including a first sentence characteristic being output as the second speech characteristic SC_2 from the speech analyser 216. The first sentence characteristic/second speech characteristic SC_2 is optionally indicative of a coherence between sentences as collected by the sentence collector 222. The first sentence characteristic/second speech characteristic SC_2 is optionally a True/False classification for coherence. The word embedding module 220 is connected to the text extractor 212 for receiving the text output 214. The word embedding module 220 is configured to embed and separate the words in text strings for provision of a text string output 226 to the sentence collector 222. The sentence collector 222 is configured to determine and collect sentences based on the text strings/text string output 226 from the word embedding module 220 for provision of a sentence output 228. The sentence output 228 is fed as second classifier input to the second classifier 224 being a second convolutional neural network. The second classifier 224 is optionally configured to classify or determine one or more sentence characteristics including a first sentence characteristic, such as a coherence between sentences and/or text strings, based on the sentence output 228. Thus, the second classifier 224 may be a coherence classifier. The first sentence characteristic is output as the second speech characteristic SC_2 from the speech analyser 216.

The one or more processors 200 comprises a cardiac arrest module 230 configured to determine and output the cardiac condition parameter CCP. The cardiac arrest module 230 is connected to one or more, such as all, of the first classifier 208, the speech analyser 216, such as text extractor 212 and/or second classifier 224, a motion data source 232, a user data source 234, and a body data source 236.

The illustrated cardiac arrest module 230 comprises a tree-based machine learning model, such as an XGBoost model.

Accordingly, the one or more processors 200 are configured to, by using feature extractor 204, first classifier 208, compression module 210, text extractor 212, speech analyser 216, and cardiac arrest module 230, to determine a cardiac condition parameter indicative of a risk of cardiac arrest based on the audio data.

The one or more processors 200 are configured to determine in block 238 whether one or more cardiac criteria based on the cardiac condition parameter CCP are satisfied. The one or more processors 200 are configured to, in output block 240 and in accordance with a first cardiac criterion being satisfied, e.g. CCP larger than a first threshold or within a first range, output a first warning signal, the first warning signal being indicative of the cardiac condition parameter CCP.

It is to be understood that a description of a feature in relation to hearing system(s) is also applicable to the corresponding method(s), hearing aid(s), and/or accessory device(s) and vice versa.

Examples of hearing system comprising hearing aid, accessory device and/or one or more processors according to the disclosure are set out in the following items:

Item 1. Hearing system comprising a hearing aid and an accessory device, the hearing aid comprising a microphone for provision of a microphone input signal, wherein one or more processors of the hearing system are configured to:

obtain audio data based on the microphone input signal;

determine a cardiac condition parameter indicative of a risk of cardiac arrest based on the audio data;

determine whether one or more cardiac criteria are satisfied; and in accordance with a first cardiac criterion being satisfied, output a first warning signal, the first warning signal being indicative of the cardiac condition parameter.

Item 2. Hearing system according to item 1, wherein to determine a cardiac condition parameter based on the audio data comprises to determine one or more speech characteristics including a first speech characteristic based on the audio data, and wherein to determine a cardiac condition parameter is based on the first speech characteristic.

Item 3. Hearing system according to item 2, wherein the first speech characteristic is selected from a speech pitch, word speed, a change in word speed, a word count, a change in word count, a phrase count, a presence of a word, a presence of a sentence, and/or mumble.

Item 4. Hearing system according to any one of items 2-3, wherein to determine one or more speech characteristics comprises to determine a second speech characteristic based on the audio data, and wherein to determine a cardiac condition parameter is based on the second speech characteristic.

Item 5. Hearing system according to item 4, wherein the second speech characteristic is different from the first speech characteristic and is selected from a word speed, a change in word speed, a word count, a change in word count, a phrase count, a presence of a word, a presence of a sentence, and and/or mumble.

Item 6. Hearing system according to any one of items 2-5, wherein to determine one or more speech characteristics comprises to convert the audio data to text data, and to determine one or more speech characteristics is based on the text data.

Item 7. Hearing system according to any one of items 1-6, wherein to determine a cardiac condition parameter based on the audio data comprises to determine one or more respiratory characteristics including a first respiratory characteristic based on the audio data, and wherein to determine a cardiac condition parameter is based on the first respiratory characteristic.

Item 8. Hearing system according to item 7, wherein the first respiratory characteristic is selected from a breathing cycle length, a change in breathing cycle length, and breathing depth.

Item 9. Hearing system according to any one of items 1-8, the hearing aid comprising a motion sensor for provision of motion data, wherein the one or more processors of the hearing system are configured to determine a cardiac condition parameter indicative of a risk of cardiac arrest based on the motion data.

Item 10. Hearing system according to any one of items 1-9, the hearing aid comprising a body sensor for provision of body data, wherein the one or more processors of the hearing system are configured to determine a cardiac condition parameter indicative of a risk of cardiac arrest based on the body data.

Item 11. Hearing system according to any one of items 1-10, wherein the hearing system is configured to obtain user data, and wherein the one or more processors of the hearing system are configured to determine a cardiac condition parameter indicative of a risk of cardiac arrest based on the user data.

Item 12. Hearing system according to any one of items 1-11, wherein to output a first warning signal comprises to transmit a first primary warning signal via a receiver of the hearing aid and/or wirelessly transmit a first secondary alarm signal via a transceiver of the hearing system.

Item 13. Method of operating a hearing system comprising a hearing aid, the hearing aid comprising a microphone, the method comprising:

obtaining a microphone input signal with the microphone;

obtaining audio data based on the microphone input signal;

determining a cardiac condition parameter indicative of a risk of cardiac arrest based on the audio data;

determining whether one or more cardiac criteria are satisfied; and in accordance with a first cardiac criterion being satisfied, outputting a first warning signal, the first warning signal being indicative of the cardiac condition parameter.

The use of the terms “first”, “second”, “third” and “fourth”, “primary”, “secondary”, “tertiary” etc. does not imply any particular order, but are included to identify individual elements. Moreover, the use of the terms “first”, “second”, “third” and “fourth”, “primary”, “secondary”, “tertiary” etc. does not denote any order or importance, but rather the terms “first”, “second”, “third” and “fourth”, “primary”, “secondary”, “tertiary” etc. are used to distinguish one element from another. Note that the words “first”, “second”, “third” and “fourth”, “primary”, “secondary”, “tertiary” etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-2 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The example operations may be performed in any order and in any combination.

It is to be noted that the word “comprising” does not necessarily exclude the presence of other elements or steps than those listed.

It is to be noted that the words “a” or “an” preceding an element do not exclude the presence of a plurality of such elements.

It should further be noted that any reference signs do not limit the scope of the claims, that the example embodiments may be implemented at least in part by means of both hardware and software, and that several “means”, “units” or “devices” may be represented by the same item of hardware.

The various example methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1 hearing system
2 user
4 hearing aid
6 accessory device
8 server
10 communication link
12 communication link
100 method of operating a hearing system
200 one or more processors of a hearing system
202 audio data
204 feature extractor
206 features of the audio data
208 first classifier, respiratory classifier
210 compression module
212 text extractor
214 text output
216 speech analyser
218 text analyser
220 word embedding module
222 sentence collector
224 second classifier
226 text string output
228 sentence output
230 cardiac arrest module
232 motion data source
234 user data source
236 body data source
238 block, criteria satisfied?
240 output block
S102 obtaining a microphone input signal with the microphone
S104 obtaining audio data based on the microphone input signal
S106 determining a cardiac condition parameter indicative of a risk of cardiac arrest based on the audio data
S108 determining whether one or more cardiac criteria are satisfied
S110 outputting a first warning signal, the first warning signal being indicative of the cardiac condition parameter
CCP cardiac condition parameter
SC_1 first speech characteristic
SC_2 second speech characteristic
RC_1 first respiratory characteristic
RC_2 second respiratory characteristic

The invention claimed is:

1. A hearing system comprising:

a communication unit; and one or more processors;

wherein the one or more processors of the hearing system are configured to:

obtain audio data based on microphone input signal provisioned by a microphone of a hearing aid;

determine a cardiac condition parameter indicative of a risk of cardiac arrest based on the audio data; and determine whether a criterion is satisfied; and wherein the hearing system is configured to output a first signal if the criterion is satisfied.

2. The hearing system according to claim 1, wherein the one or more processors of the hearing system are configured to determine one or more speech characteristics including a first speech characteristic based on the audio data, and wherein the cardiac condition parameter is based on the first speech characteristic.

3. The hearing system according to claim 2, wherein the first speech characteristic comprises a speech pitch, word speed, a change in word speed, a word count, a change in word count, a phrase count, a presence of a word, a presence of a sentence, or a presence of mumble.

4. The hearing system according to claim 2, wherein the one or more processors of the hearing system are configured to determine a second speech characteristic based on the audio data, and wherein the cardiac condition parameter is based on the second speech characteristic.

5. The hearing system according to claim 4, wherein the second speech characteristic is different from the first speech characteristic, and comprises a word speed, a change in word speed, a word count, a change in word count, a phrase count, a presence of a word, a presence of a sentence, or a presence of mumble.

6. The hearing system according to claim 2, wherein the one or more processors of the hearing system are configured to determine the one or more speech characteristics by converting the audio data to text data, and wherein the one or more speech characteristics are based on the text data.

7. The hearing system according to claim 1, wherein the one or more processors of the hearing system are configured to determine one or more respiratory characteristics based on the audio data, and wherein the cardiac condition parameter is based on the one or more respiratory characteristics.

8. The hearing system according to claim 7, wherein the first respiratory characteristic comprises a breathing cycle length, a change in breathing cycle length, or breathing depth.

9. The hearing system according to claim 1, the hearing aid comprising a motion sensor for provision of motion data, and wherein the one or more processors of the hearing system are configured to determine the cardiac condition parameter based on the motion data.

10. The hearing system according to claim 1, the hearing aid comprising a body sensor for provision of body data, and wherein the one or more processors of the hearing system are configured to determine the cardiac condition parameter based on the body data.

11. The hearing system according to claim 1, wherein the hearing system is configured to obtain user data, and wherein the one or more processors of the hearing system are configured to determine the cardiac condition parameter based on the user data.

12. The hearing system according to claim 1, wherein the hearing system is configured to output the first signal by transmitting a warning signal via a receiver of the hearing aid.

13. The hearing system according to claim 1, wherein the hearing system is configured to output the first signal by wirelessly transmitting an alarm signal via the communication unit of the hearing system.

14. The hearing system according to claim 1, wherein the one or more processors are configured to determine whether the criterion is satisfied based on the cardiac condition parameter.

15. The hearing system according to claim 1, wherein the hearing system is or comprises the hearing aid.

16. The hearing system according to claim 15, wherein the communication unit is configured to communicate with an accessory device.

17. The hearing system according to claim 1, wherein the hearing system is or comprises an accessory device.

18. The hearing system according to claim 17, wherein the communication unit is configured to communicate with the hearing aid.

19. The hearing system according to claim 1, wherein the hearing system comprises the hearing aid and an accessory device, and wherein the one or more processors are at the hearing aid, at the accessory device, or at both the hearing aid and the accessory device.

20. The hearing system according to claim 1, wherein the one or more processors of the hearing system is configured to determine a speech pitch based on the audio data, and to determine the cardiac condition parameter indicative of the risk of cardiac arrest based on the speech pitch.

21. The hearing system according to claim 1, wherein the one or more processors of the hearing system is configured to determine a word speed or a change in the word speed based on the audio data, and to determine the cardiac condition parameter indicative of the risk of cardiac arrest based on the word speed or the change in the word speed.

22. The hearing system according to claim 1, wherein the one or more processors of the hearing system is configured to determine a word count or a change in the word count based on the audio data, and to determine the cardiac condition parameter indicative of the risk of cardiac arrest based on the word count or the change in the word count.

23. The hearing system according to claim 1, wherein the one or more processors of the hearing system is configured to determine a presence of mumble based on the audio data, and to determine the cardiac condition parameter indicative of the risk of cardiac arrest based on the presence of the mumble.

24. The hearing system according to claim 1, wherein the one or more processors of the hearing system is configured to determine a breathing depth based on the audio data, and to determine the cardiac condition parameter indicative of the risk of cardiac arrest based on the breathing depth.

25. The hearing system according to claim 1, wherein the one or more processors of the hearing system is configured to determine a change in breathing cycle based on the audio data, and to determine the cardiac condition parameter indicative of the risk of cardiac arrest based on the change in the breathing cycle.

26. The hearing system according to claim 1, wherein the one or more processors of the hearing system is configured to determine a phrase count based on the audio data, and to determine the cardiac condition parameter indicative of the risk of cardiac arrest based on the phrase count.

27. A method performed by a hearing system, the method comprising:

obtaining a microphone input signal provided by a microphone of a hearing aid;

obtaining audio data based on the microphone input signal;

determining a cardiac condition parameter indicative of a risk of cardiac arrest based on the audio data;

determining whether a criterion is satisfied; and outputting a signal if the criterion is satisfied.

* * * * *